United States Patent [19]
Lewis et al.

[11] Patent Number: 5,152,599
[45] Date of Patent: Oct. 6, 1992

[54] CONTACT STRIP LIGHTING SYSTEM

[75] Inventors: Mack A. Lewis; William P. Pelchat, both of Sioux City, Iowa

[73] Assignee: Wilson Trailer Company, Sioux City, Iowa

[21] Appl. No.: 738,624

[22] Filed: Jul. 31, 1991

[51] Int. Cl.⁵ .............................................. B60Q 1/32
[52] U.S. Cl. ........................................ 362/80; 362/61; 362/237
[58] Field of Search .................. 362/80, 61, 236, 237, 362/74, 83.3

[56] References Cited

U.S. PATENT DOCUMENTS

| | | | |
|---|---|---|---|
| 3,107,061 | 10/1963 | Morgan | 362/226 |
| 3,109,598 | 11/1963 | Morgan | 362/226 |
| 3,321,731 | 5/1967 | Goldbaum | 362/74 |
| 3,527,933 | 9/1970 | Thümmel | 362/226 |
| 4,204,273 | 5/1980 | Goldberg | 362/217 |
| 4,819,136 | 4/1989 | Ramsey | 362/81 |

FOREIGN PATENT DOCUMENTS

| | | | |
|---|---|---|---|
| 827527 | 7/1949 | Fed. Rep. of Germany | 362/80 |
| 483161 | 7/1952 | Italy | 362/80 |

Primary Examiner—Ira S. Lazarus
Assistant Examiner—L. Heyman
Attorney, Agent, or Firm—Fleit, Jacobson, Cohn, Price, Holman & Stern

[57] ABSTRACT

A contact strip lighting system for vehicular truck bodies, semi-trailer or trailer truck bodies and other installations where a plurality of lights are to be connected to a power source. The contact strip lighting system of this invention includes a laminated contact tape which consists of an inner or bottom layer having adhesive material for attachment to a truck body or other mounting surface and being constructed of insulating material to insulate an encapsulated conductor strip from the mounting surface. An intermediate layer is in the form of a single flat metallic conductor strip insulated between the bottom layer and top layer of the laminated strip. An outer or top layer is constructed of insulating material and is used to insulate the conductor strip and provided with a reflective outer surface to enable approaching vehicle operators to more readily see the truck body when the contact strip is attached thereto. One light at the end of the contact strip is connected to a power harness and supplies power to the conductor strip with the other lights being connected electrically to the conductor strip with the top layer of insulation being cut away to enable contact between the lights and conductor strip.

7 Claims, 2 Drawing Sheets

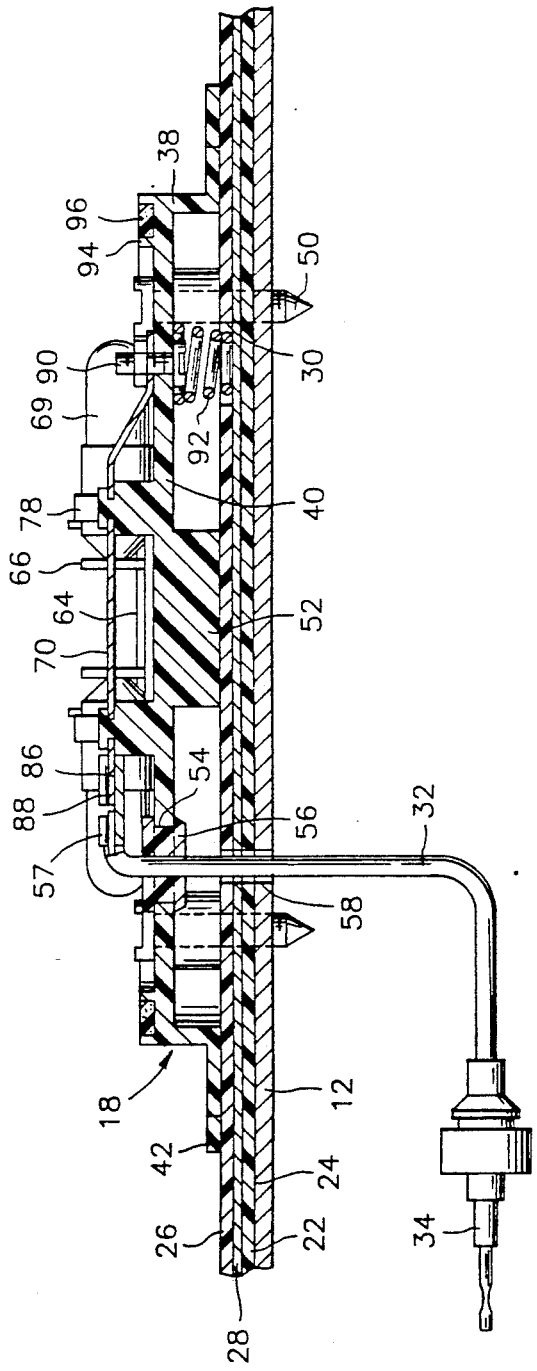

CONTACT STRIP LIGHTING SYSTEM

BACKGROUND OF THE INVENTION

1. Field of the Invention

A contact strip lighting system for vehicular truck bodies, semi-trailer or trailer truck bodies and other installations where a plurality of lights are to be connected to a power source. The contact strip lighting system of this invention includes a laminated contact tape which consists of an inner or bottom layer having adhesive material for attachment to a truck body or other mounting surface and being constructed of insulating material to insulate an encapsulated conductor strip from the mounting surface. An intermediate layer is in the form of a single flat metallic conductor strip insulated between the bottom layer and top layer of the laminated strip. An outer or top layer is constructed of insulating material and is used to insulate the conductor strip and provided with a reflective outer surface to enable approaching vehicle operators to more readily see the truck body when the contact strip is attached thereto. One light at the end of the contact strip is connected to a power harness and supplies power to the conductor strip with the other lights being connected electrically to the conductor strip with the top layer of insulation being cut away to enable contact between the lights and conductor strip.

2. Description of the Prior Art

Large vehicles such as trucks, semitrailers, trailers, buses and the like are required to have clearance or running lights mounted at predetermined locations thereon including longitudinally spaced locations along the sides of the vehicle body. Various arrangements have been provided to mount the lights securely to the vehicle body and connect the lights to an electrical circuit for receiving power from the vehicle battery. The following U.S. patents relate to this field of endeavor.

U.S. Pat. No. 3,107,061
U.S. Pat. No. 3,109,598
U.S. Pat. No. 3,527,933
U.S. Pat. No. 4,204,273
U.S. Pat. No. 4,922,395

The prior art does not disclose a continuous conductive strip and attached light units as disclosed in this application.

SUMMARY OF THE INVENTION

An object of the invention is to provide a lighting system for a vehicle truck body or the like which includes a continuous contact strip combined with a series of lights attached thereto with one light in the series being used to supply power to a conductor strip encapsulated in the contact strip.

Another object of the invention is to provide a lighting system in accordance with the preceding object in which the contact strip is a laminated tape including a bottom layer having adhesive for attachment to the vehicle with the bottom layer insulating the conductor strip from the mounting surface. A flat metallic conductor strip is sandwiched between the bottom layer and a top layer of the laminated tape with the top layer being used to insulate the conductor strip and being optionally provided with a reflective surface.

A further object of the invention is to provide a contact strip lighting system including a unique method of connecting light units thereto by removing a small portion of the outer layer of the laminated contact strip with electrical contact being made by a small compression spring which extends through the opening in the outer layer into engagement with the conductor strip with the conductor strip supplying power and ground to the battery being provided by the mounting of the lights on the truck body.

Still another object of the invention is to provide a lighting system in accordance with the preceding objects in which the supply light unit includes a conductor connected to the vehicle electric circuit and a spring biased contact engaged with the conductor strip through an opening formed in the outer layer to provide electrical energy to the conductor strip and the light mounted on the supply light unit with all other lights including a spring contact engaged with the conductor strip with each light unit including a removable lens and a mounting structure for securing the light unit to the vehicle body.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a longitudinal sectional view, on an enlarged scale, taken along section line 4—4 on FIG. 2 illustrating structural details of the power supply light unit.

FIG. 5 is a longitudinal sectional view, on an enlarged scale, taken along section line 5—5 on FIG. 1 illustrating the cover lens.

DESCRIPTION OF THE PREFERRED EMBODIMENT

Figure 1:
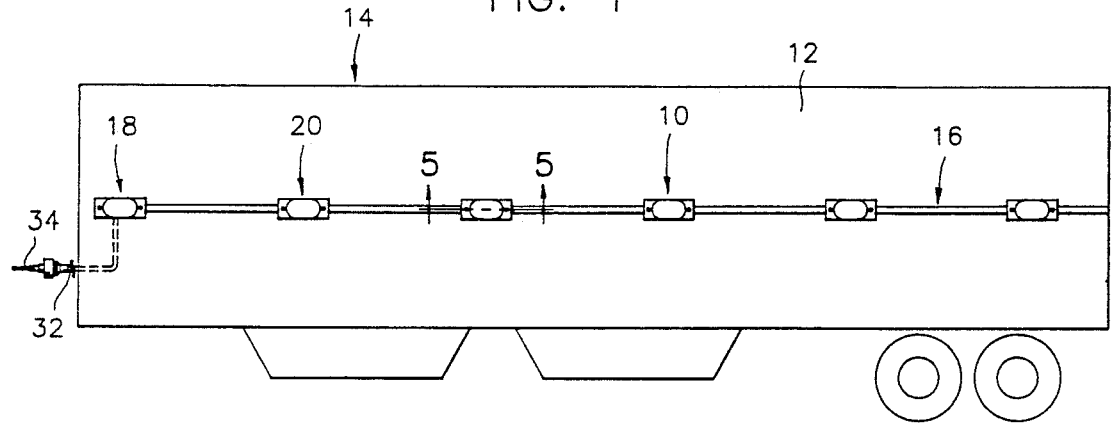
FIG. 1 is a side elevational view illustrating the lighting system of the present invention installed on the side wall of a vehicle body.

Referring now to the drawings, the lighting system of the present invention is generally designated by reference numeral 10 and, as illustrated in FIG. 1, the lighting system 10 is mounted on the side walls 12 of a vehicle body generally designated by reference numeral 14 which may be in the form of a load carrying body such as found on trucks, trailers, semitrailers, buses and other vehicles on which it is desired to mount the lighting system 10.

The lighting system includes a longitudinally continuous contact strip 16 mounted on the vehicle side wall 12 with one end of the contact strip having a supply light unit generally designated by reference 18 and the contact strip 16 is also provided with a plurality of standard light units 20 connected thereto. The location of the lighting system 10 can vary along with the length thereof and the orientation of the light units 18 and 20 depending upon the installational requirements of the vehicle body 14. The contact strip 16 includes a laminated structure including an inner or bottom layer 22 of flexible insulating material such as plastic or the like that is adhesively secured to the vehicle wall 12 by adhesive at 24 on the inner surface of the bottom layer 22. A top layer 26 of the same material as the bottom layer 22 overlies and is bonded to the layer 22 to sealingly encapsulate a continuous conductor strip 28 that is laminated between or sandwiched between the laminated layers 22 and 26. The external surface of the top or outer layer 26 may be provided with reflective capabilities to further enhance visibility of the body 14.

At points at which the lights 18 and 20 are to be mounted, the portion of the outer layer 26 which overlies the conductor strip 28 is cut away or removed to form an opening 30 therethrough to enable access to the conductor strip 28. The opening 30 may be of circular configuration and may be easily formed by using an appropriately sized cookie cutter device which can be used in a conventional manner to form circular openings 30 at desired locations along the length of the contact strip 16 thus enabling access to the conductor strip 28 at predetermined points. A cookie cutter of cylindrical configuration having a sharpened edge is forced against the outer surface of the outer layer 26 and inward force is exerted thereon while rotation is imparted thereto in order to form a cylindrical cut in the outer layer 26 with the cutout portion being easily removed by peeling it off of the conductor strip 28.

The light units 18 and 20 are similar except that the power supply light unit 18 includes a conductor 32 having a connector 34 on the free end thereof for connection with the wiring harness of the vehicle to supply power to the light unit 18 and to the conductor strip 28. The standard light units 20 are the same as light unit 18 except they do not include a conductor 32.

Each light unit 18 and 20 includes a generally oval shaped base 36 constructed of plastic or other rigid insulating material with the base including a peripheral wall 38 around the periphery of a generally flat mounting plate 40 that is spaced above the bottom edge of the wall 38 and spaced slightly downwardly from the upper edge of the wall 38. Each end of the base 36 is provided with a mounting tab 42 that is integral with the lower edge of the wall 38 and includes an aperture 44 to receive mounting screws 46 for a cover lens 48 to be described in more detail hereinafter. The plate 40 receives a pair of mounting screws 50 inwardly of the peripheral wall 38 and along the center line of the base which may be in the form of sheet metal screws or the like to secure the base 36 fixedly, but removably to the side wall 12. The central portion of the plate 40 includes a depending support member 52 to maintain the plate 40 generally parallel with the wall panel 12.

Figure 2:
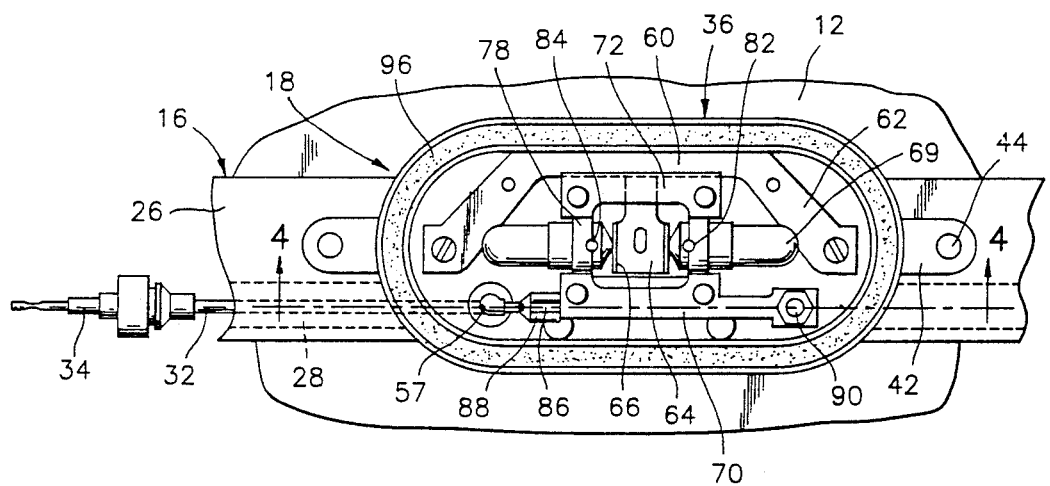
FIG. 2 is a plan view of the power supply light unit with the cover lens removed.
Figure 3:
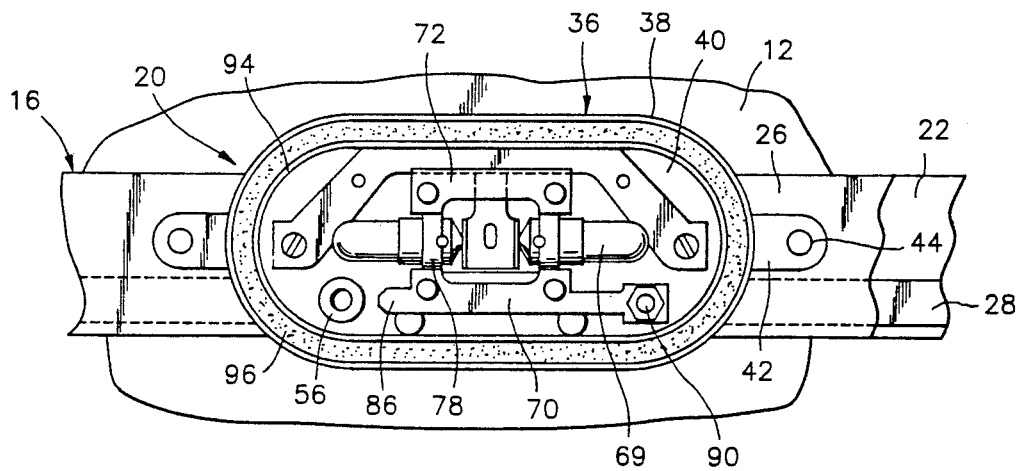
FIG. 3 is a plan view of the other light units in the system.

As illustrated in FIGS. 2 and 3, the conductor strip 28 is offset toward one edge of the contact strip 16 so that the mounting screws 46 and 50 will not come into contact with the conductor strip 28. Each base 36 also includes an aperture 54 adjacent one end of the plate 40 and offset towards one side thereof for alignment with the conductor strip 28. A rubber grommet 56 is positioned in the hole 54. In the power supply light unit 18, the rubber grommet 56 receives the insulated conductor 32 therethrough with the conductor 32 including a connector 57 on the inner end thereof with the other end of the conductor 32 including a connector 34. The conductor 32 extends through a hole 58 formed in the contact strip 16 and the panel 12 to enable the conductor to be connected with a power source. The grommet 56 in the standard light units 20 serves no function other than to form a substantial closure for the opening 54 through the plate 40. This enables all of the base plates to be made in exactly the same manner to facilitate manufacture at a minimum cost with the conductor 32 being associated only with the power supply light unit 18.

Each base includes an elongated contact strip 60 extending longitudinally along one side thereof with the ends of the contact strip being angulated inwardly at 62 with the ends thereof positioned under the mounting screws 50 thus forming a ground contact strip connected to the trailer wall panel 12 by the conductor screws. The center of the strip 60 is provided with a transversely extending strip 64 which terminates in a pair of upturned resilient edge plates 66 forming a contact plate for the contact at the center of the base 68 of a pair of light bulbs 69. Thus, the two light bulbs 69 are grounded to the ground contact strip 60 by contact with the resilient upturned edge flanges 66.

Each of the light units also includes a pair of electrical supply strips 70 and 72 which are supported above the plate 40 by upstanding supports 74 having projections 76 which extend through openings in the strips 70 and 72 and are deformed over the upper surface of the strips 70 and 72 to lock them to the supports. The strips 70 and 72 are interconnected by transverse, semicircular connecting strips 78 which form the top half of a socket for receiving the cylindrical metallic base 80 of the light bulb 69 with the other half of the base 80 being supported by a semi-cylindrical cradle formed in the support 74 which extends transversely on the plate 40. The inner edges of the transverse members 78 have recesses 82 therein which engage the projecting pins 84 on the light bulb 69. Thus, the contact on the inner end of the tapered end 68 of the light bulb 69 is resiliently biased outwardly so that the pins 84 will engage the notches 82 to releasably secure the bulbs 69 in the bulb sockets with the contact on the tapered end of the base being engaged with the contact 66 on the ground strip 60 and the cylindrical base 80 engaged with the supply strips 70 and 72 through the transverse member 78. The strip 70 includes a projecting tine 86 which telescopically receives a conventional connector 88 on the end of the conductor 32 with the crimped connection 57 connecting the conductor wire to the connector 88. The opposite end of the strip 70 is provided with a screw threaded fastener 90 extending therethrough with the fastener also extending through the base plate 40 and securing a tapered coil compression spring 92 therethrough in electrical contact with the projecting end portion 89 of the strip 70. The lower end of the spring 92 extends through and is in resilient sliding contact with the conductor strip 28 as illustrated in FIGS. 4 and 5.

The plate 40 also includes a short flange or wall 94 spaced from the top edge of the peripheral wall 38 with a resilient sealing gasket 96 positioned therebetween for engaging a continuous peripheral flange 98 on the lens 48 which includes a continuous arcuate wall 100 having recesses 102 therein receiving the fastening screws 46 to form a sealed cover for each of the light units. The lens cover 48 may be transparent or provided with a desired color, such as yellow, to satisfy color requirements for vehicle side lights.

The contact strip lighting system includes an adhesively attached contact strip or tape having a bottom and top layer sandwiching a conductor strip therebetween with the layers being bonded and sealed in relation to each other and encapsulating and insulating the conductor strip. The contact strip is adhesively attached to a vehicle body such as the metal skin of a truck body, trailer body or the like with adhesive being used to secure the contact strip in place. As indicated, the laminated reflector contact strip is mounted along the full length on the outside of the trailer where lights are to be installed which is accomplished by cutting a circular opening in the outer layer of the laminated strip by using a cookie cutter or similar cutting implement to provide access to the conductor strip at longitudinally space points. The cut out area of the outer layer is then peeled off to expose the conductor strip through the opening formed by the removed portion of the outer layer. A corrosion preventing material, such as grease, may be applied lightly to the outer surface of the exposed conductor strip. The light units are then mounted with the supply light unit 18 being provided with a hole 58 drilled through the laminated strip and outside skin of the vehicle body for passage of the conductor 32 with caution being used not to drill through the conductor strip in the contact strip thus maintaining the conductor strip 28 insulated from the truck body while the mounting bolts provide a ground contact with the metallic skin of the truck body. The power supply light unit 18 is mounted with the contact 92 being aligned with and engaged with the conductor strip 28 in order to electrically connect the harness connector 34 with the conductor strip 28 to energize the conductor strip 28. The standard lights 20 are then mounted in a similar manner with their contact member 92 being in the form of a coil spring in electrical contact with the conductor strip 28 through the opening 30.

The light units illustrated are for the use on a vehicle having a conductive mounting surface to be used for ground. When the vehicle body mounting surface or wall panel 12 is of non-conductive material such as wood, fiberglass reinforced plastic material and the like, two conductor strips can be included in the laminated contact strip or tape with the light mounting screws making contact with the second conductor strip to provide a ground for the light.

With this construction, a continuous conductor strip is insulated and encapsulated and adhesively or otherwise attached to the surface of the vehicle body. The external layer of the laminated contact strip is removed by using a cookie cutter or other implement to expose the conductor strip at spaced locations. The light units are then attached to the vehicle body with the contact member on each light unit in electrical contact with the conductor strip through the opening formed in the external layer of the contact strip. The lens is then applied to the light base in sealed relation thereto. The power supply light unit 18 is mounted in the same manner except that a hole is drilled through the vehicle body and to one side of the conductor strip for receiving the insulating conductor having the coupling on the end thereof for connection with the harness. The conductor from the harness is connected to the light socket in the supply light which in turn is in electrical contact with the conductor strip through the contact member which extends through the hole in the external layer of the contact strip.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A lighting system for a vehicle including a plurality of light units adapted to be mounted in spaced locations along the surface of a vehicle body, a contact strip extending along the surface of the vehicle body with the light units being mounted thereon, said contact strip including a continuous tape having a continuous conductor strip encapsulated therein in order to insulate the conductor strip from the vehicle body, said contact strip having portions outwardly of the conductor strip removed to expose the conductor strip at predetermined locations, each light unit including a spring biased contact member extending through a removed portion of the contact strip into electrical contact with the conductor strip, each light unit including a base and lens with light socket means and bulb means mounted on the base in electrical contact with the contact member engaging the conductor strip, one of said light units being located at the end of the contact strip and including a conductor extending from the light unit for connection with a wiring harness of a vehicle to supply electrical energy to the end light unit, said end light unit including an electrical connection between said contact member engaging the conductor strip and said conductor connected with the wiring harness to supply the conductor strip in the contact strip with electrical energy for energizing all of the other light units.

2. The lighting system as defined in claim 1 wherein said base of said end light unit includes a grommeted opening, said conductor from the end light unit extending through the grommeted opening and through a passageway formed in the vehicle body for connection with the wiring harness.

3. The lighting system as defined in claim 1 wherein each of said light units is mounted to the vehicle body by screws whereby the light units are grounded to a vehicle body having conductive characteristics to serve as a ground, said screws extending through the contact strip in laterally spaced relation to the conductor strip whereby said light units are connected to the vehicle body in insulated relation to the conductor strip in the contact strip to maintain the conductor strip insulated from the vehicle body and with the vehicle body forming a ground for the light units.

4. The lighting system as defined in claim 1 wherein the light socket means and bulb means includes a pair of oppositely facing sockets receiving oppositely facing light bulbs, said base including a power supply strip mounted thereon connected with the light sockets, said base including a ground strip mounted thereon connected with the ground contact in the base of each bulb to complete a circuit to both bulbs.

5. The method of providing a lighting system for a vehicle body consisting of the steps of mounting a continuous contact strip having an encapsulated conductor strip therein on the surface of the vehicle body, forming at least one opening in the contact strip from the outer surface thereof to the conductor strip to provide access to the conductor strip, and mounting a light unit having a spring biased contact member in overlying relation to the contact strip with the contact member engaging the conductor strip to provide electrical communication between the light unit and conductor strip, said step of forming an opening in the outer surface of the contact strip including utilizing a tool in the form of a cookie cutter placed against the outer surface of the contact strip and rotated while inward force is exerted thereon to sever a circular piece of the outer layer of the contact strip which can be removed to expose the conductor strip.

6. A lighting system for a vehicle having a generally flat conductive surface grounded to the electrical system of the vehicle, an elongated, thin contact strip attached to the conductive grounded surface, said contact strip having a conductor strip encapsulated therein thereby insulating the conductor strip from the conductive grounded surface, means electrically connecting the conductor strip to the electrical system of the vehicle, at least one light unit mounted on said conductive grounded surface and including a base mounted in overlying relation to the contact strip, a portion of the contact strip underlying the base having an opening formed therein to expose the conductor strip to the base, said base including a spring biased contact member engaged with the conductor strip through the opening in the contact strip, said base including a light bulb socket and light bulb electrically connected to said contact member to supply electrical energy to the bulb, said base including a mounting member electrically connected with a ground contact in the base of the bulb and extending into the conductive grounded surface in spaced relation to the conductor strip to ground the light bulb to the conductive grounded surface to complete an electrical circuit for energizing the light bulb.

7. The lighting system as defined in claim 6 wherein said means connecting the conductor strip with the electrical system of the vehicle includes a conductor electrically connected to the contact member and extending from said base for electrical connection with a wiring harness forming part of the electrical system of the vehicle to supply electrical energy through the conductor to the contact member and to the conductor strip thereby energizing the conductor strip for energizing multiple light units electrically connected to the conductor strip and grounded to the conductive grounded surface.

* * * * *